Figure 1:
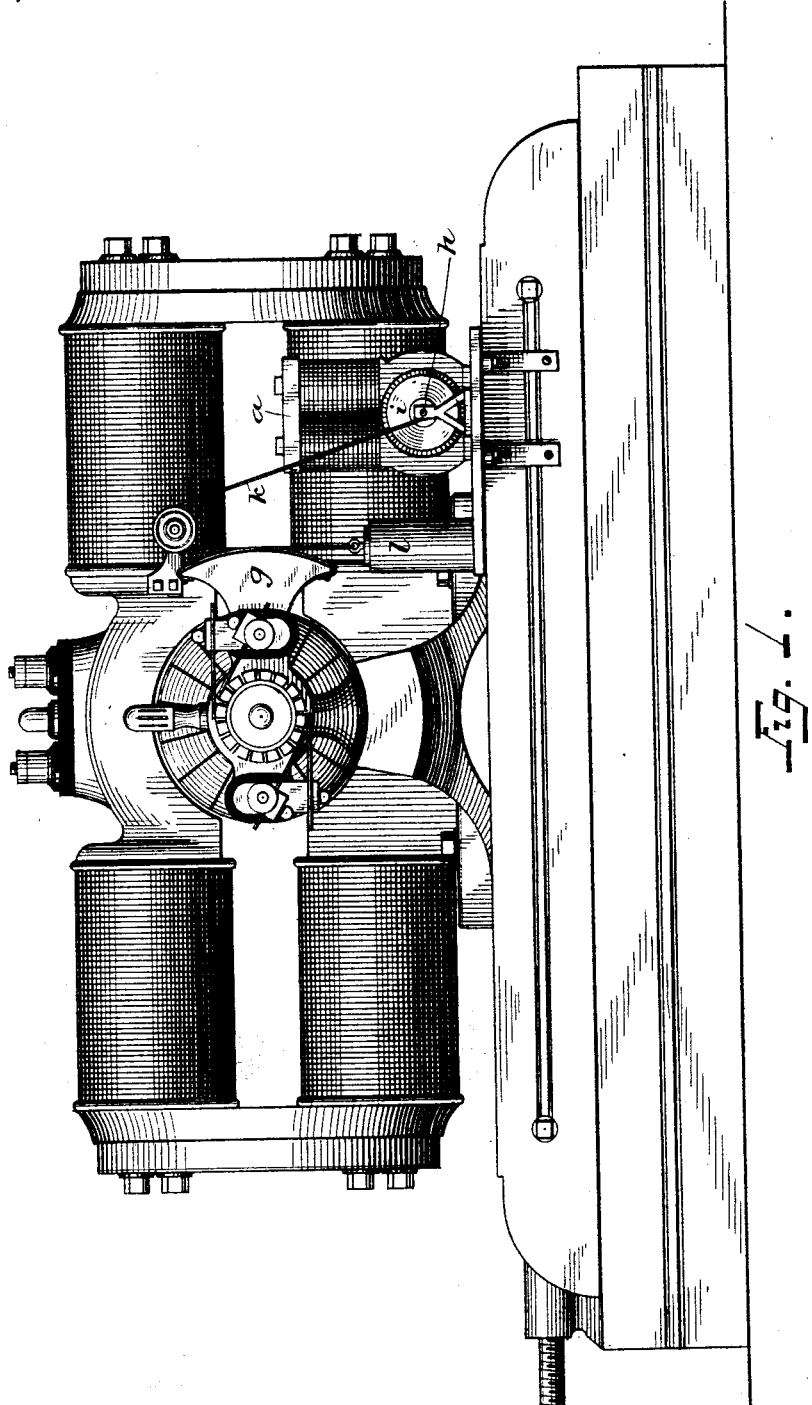

(No Model.) 9 Sheets—Sheet 1.
C. D. HASKINS.
ELECTRIC CURRENT REGULATOR.

No. 516,487. Patented Mar. 13, 1894.

Witnesses
Chas. G. Hawley.
Geo. R. Parker.

Inventor:
Charles D. Haskins.
By George P. Barton
Attorney.

(No Model.) 9 Sheets—Sheet 3.

C. D. HASKINS.
ELECTRIC CURRENT REGULATOR.

No. 516,487. Patented Mar. 13, 1894.

Witnesses.
Chas. G. Hawley.
Geo. R. Parker.

Inventor.
Charles D. Haskins.
By George P. Barton
Attorney.

(No Model.)
9 Sheets—Sheet 4.

C. D. HASKINS.
ELECTRIC CURRENT REGULATOR.

No. 516,487.
Patented Mar. 13, 1894.

Witnesses.
Chas. G. Hawley
Geo. R. Parker

Inventor.
Charles D. Haskins.
By George P. Barton
Attorney.

(No Model.) 9 Sheets—Sheet 5.
C. D. HASKINS.
ELECTRIC CURRENT REGULATOR.
No. 516,487. Patented Mar. 13, 1894.
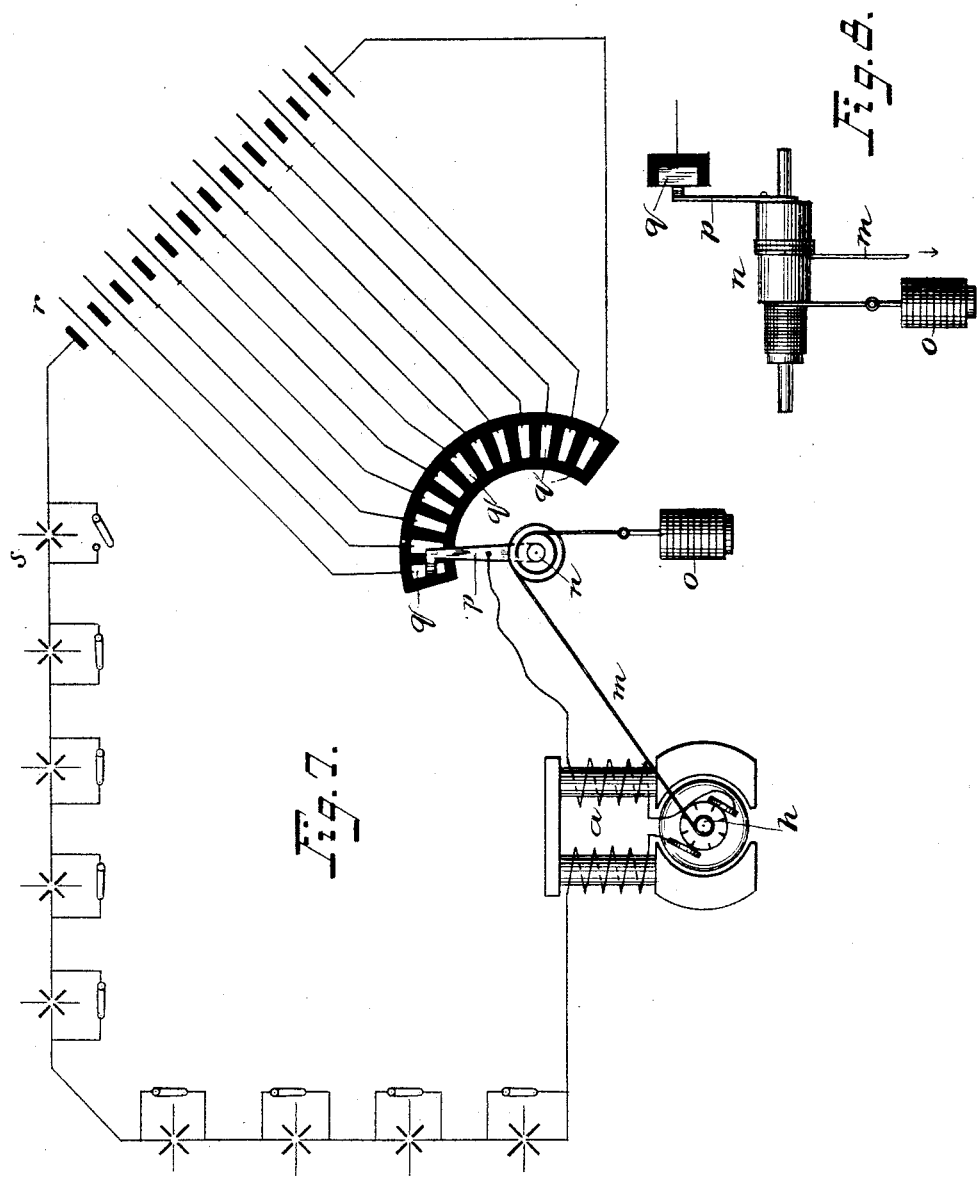

(No Model.)  
9 Sheets—Sheet 6.

C. D. HASKINS.
ELECTRIC CURRENT REGULATOR.

No. 516,487.  
Patented Mar. 13, 1894.

Witnesses.  
Chas. G. Hawley.  
Geo. R. Parker.

Inventor.  
Charles D. Haskins.  
By George A. Barton  
Attorney.

THE NATIONAL LITHOGRAPHING COMPANY,  
WASHINGTON, D. C.

(No Model.) 9 Sheets—Sheet 7.
C. D. HASKINS.
ELECTRIC CURRENT REGULATOR.

No. 516,487. Patented Mar. 13, 1894.

Witnesses.
Chas. G. Hawley.
Geo. R. Parker.

Inventor.
Charles D. Haskins
By George P. Barton
Attorney.

(No Model.) 9 Sheets—Sheet 9.

C. D. HASKINS.
ELECTRIC CURRENT REGULATOR.

No. 516,487. Patented Mar. 13, 1894.

Witnesses.
Chas. G. Hawley.
Geo. R. Parker.

Inventor.
Charles D. Haskins.
By. George P. Barton
Attorney.

UNITED STATES PATENT OFFICE.

CHARLES DARWIN HASKINS, OF BROOKLYN, NEW YORK, ASSIGNOR TO THE WESTERN ELECTRIC COMPANY, OF CHICAGO, ILLINOIS.

ELECTRIC-CURRENT REGULATOR.

SPECIFICATION forming part of Letters Patent No. 516,487, dated March 13, 1894.

Application filed April 1, 1889. Serial No. 305,546. (No model.)

*To all whom it may concern:*

Be it known that I, CHARLES DARWIN HASKINS, a citizen of the United States, residing at Brooklyn, in the county of Kings and State of New York, have invented a certain new and useful Improvement in Electric-Current Regulators, (Case No. 4,) of which the following is a full, clear, concise, and exact description, reference being had to the accompanying drawings, forming a part of this specification.

The objects of my invention are briefly stated, first, to provide for automatically maintaining the current strength in a circuit supplied by a dynamo electric machine as for example, in electric arc light systems; second, to maintain the current strength by an automatic movement of the brushes forward and backward upon the commutator by the direct action of an electric motor included in the circuit; third, to cause a motor placed in the circuit of the dynamo machine to act upon the mechanism by which the current is taken up from the revolving armature to maintain the current strength; fourth, to automatically increase or decrease the number of battery elements employed in a circuit as the resistance increases or decreases, thus maintaining a constant or approximately constant current strength in such circuit; fifth, to automatically increase or decrease the resistance of a circuit as the electro motive force causes the current in such circuit to increase or decrease, thereby maintaining a practically constant current strength; sixth, to provide a motor in the circuit of a dynamo machine in connection with friction devices and switching apparatus operated thereby, so arranged that the ampère turns of the field magnet coils may be varied to maintain a constant current strength notwithstanding variations in the resistance of the circuit; and, seventh, to provide for communicating energy from a revolving shaft to another mechanical device through the agency of a centrifugal friction device, whereby variations in the speed of the revolving shaft cause the force exerted upon the said mechanical device to vary in a greater ratio than the variation of the speed of the revolving shaft.

Heretofore various styles of automatic regulators have been used in connection with dynamo electric machines when employed in arc lighting, among which I would mention the Brush and Weston regulators, each of which consists in devices for changing the strength of the field of force magnets in response to changes of resistance in the external circuit. This form of regulator will be understood by reference to Letters Patent No. 224,511, granted Charles F. Brush, February 17, 1880, and Letters Patent No. 211,311, granted Edward Weston, January 14, 1879. Another form of automatic regulator is shown in Letters Patent No. 228,543, granted Hiram S. Maxim June 8, 1880. The Maxim regulator is so arranged that the brushes of an auxiliary machine which supply current to the field magnets of the principal machine are moved forward and backward in response to variations of current strength in the main circuit thus increasing or decreasing the field of force magnets in the principal machine so as to maintain an approximately constant current strength in the external circuit, notwithstanding variations in the resistance of said circuit.

Other forms of regulators in which the brushes have been moved upon the commutator have been employed since the date of Maxim's patent with good results. These regulators have, however, been in their action more sluggish than is consistent with good work under all the varying conditions of the circuit in arc lighting. When only three or four lamps have been added to or taken from the circuit at a time these regulators have responded with reasonable promptness; when, however, a large percentage of the lamps or all but one have been cut out at once damage has frequently resulted to the machine, the brushes and coils sometimes being burned out or damaged. When a large number of lamps are added so as to abruptly increase the resistance of the circuit the commutator flashes, resulting frequently in serious injury. When a machine carrying a full load is suddenly short circuited these regulators are so sluggish that either the armature is burned out and the brushes destroyed, or the shaft twisted and broken, or a belt supplying the power thrown off. A machine is liable to all these injuries when used in connection with brush moving regulators now in use.

The construction of my regulator is such that the machine carrying a full load may be short circuited or any part or all of the lamps removed from the circuit or brought into the circuit abruptly without any injurious result.

My regulator, in addition to its promptness in responding to great changes in the resistance of the external circuit is so sensitive as to instantly respond to the slightest changes in the current strength of the external circuit so as to maintain, so to speak, an absolutely uniform current strength as distinguished from an approximately uniform current strength which has only been attainable heretofore.

My invention is illustrated in the accompanying drawings, in which—

Figure 2:
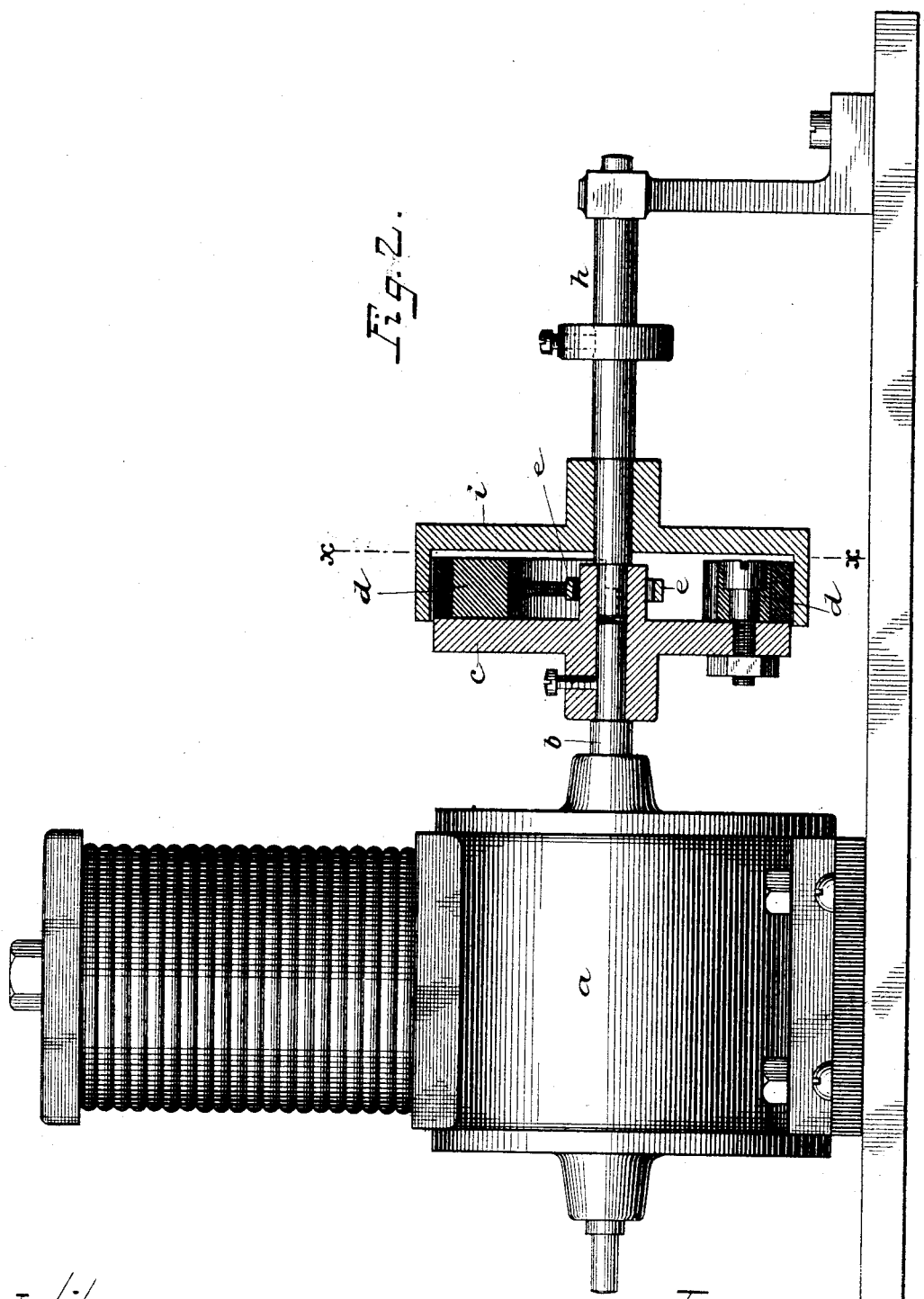
Figure 3:
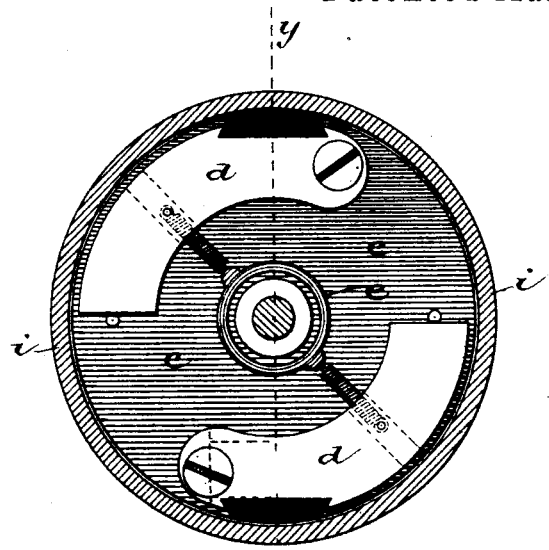
Figure 4:
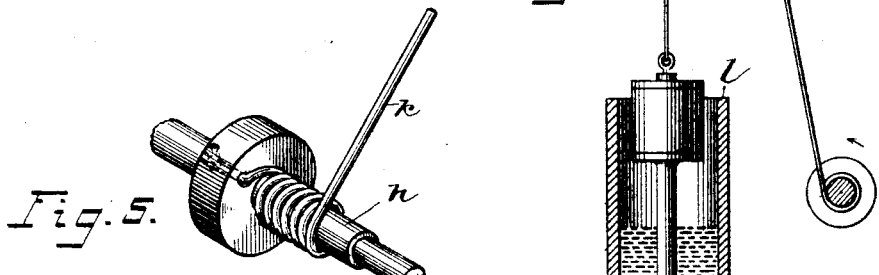
Figure 5:
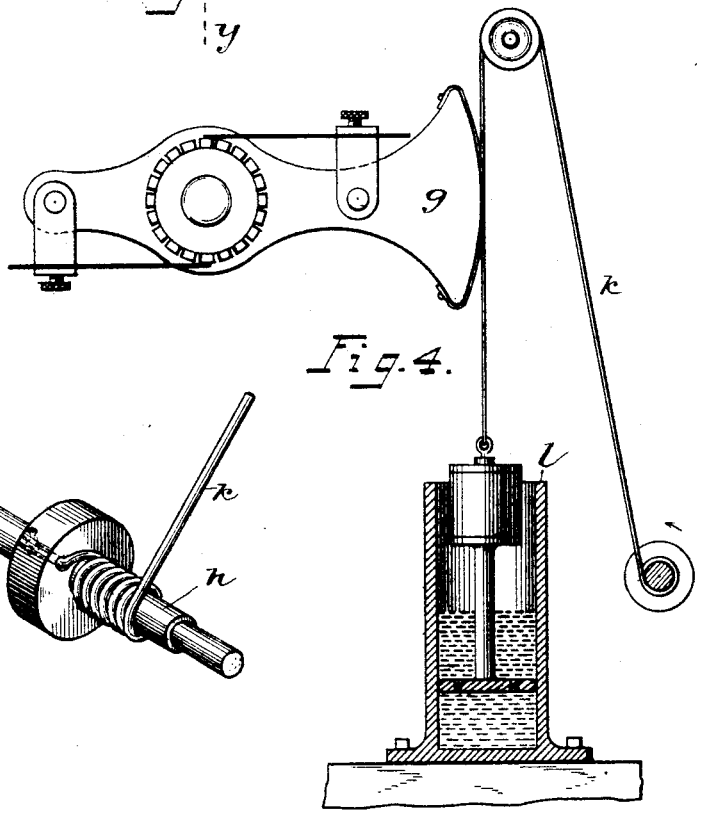
Figure 4:
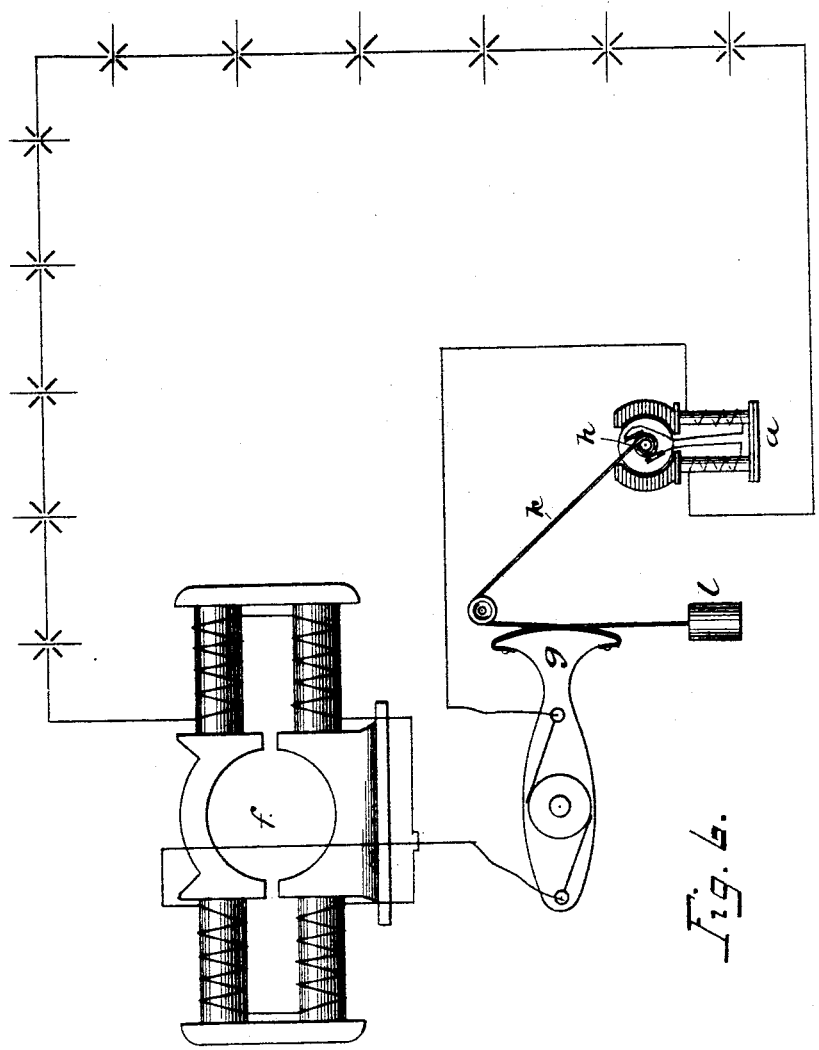
Figure 9:
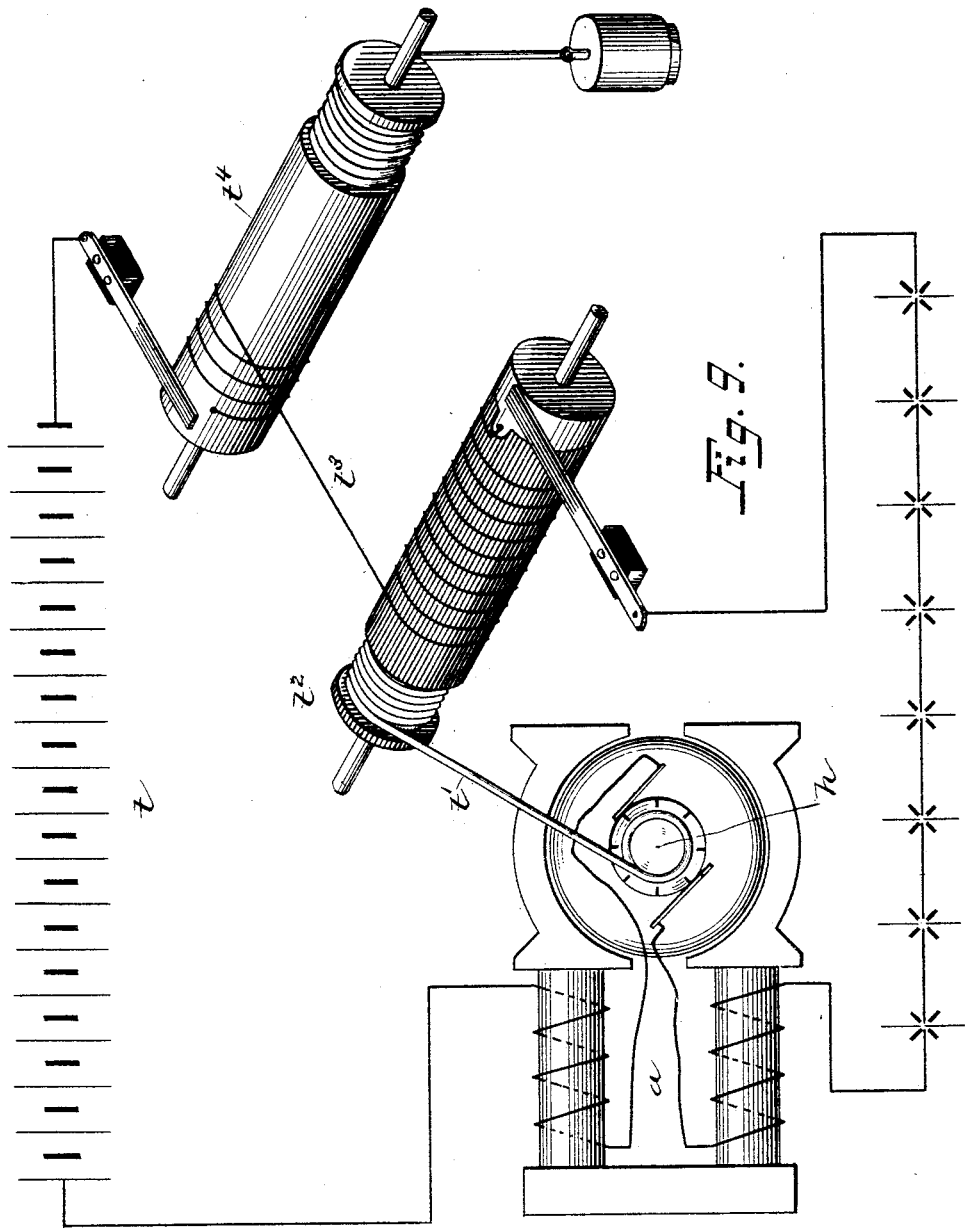
Figure 10:
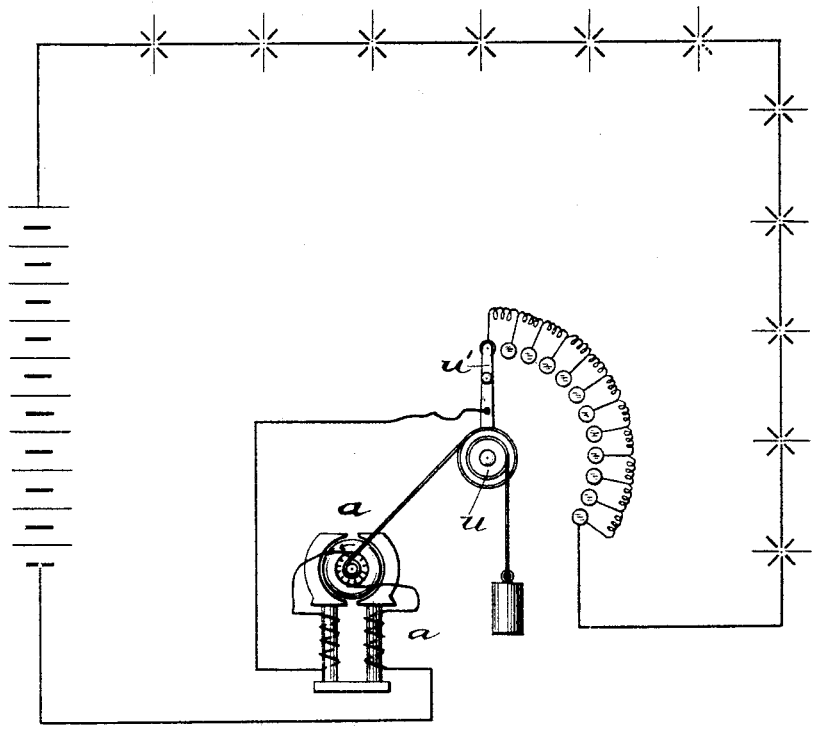
Figure 11:
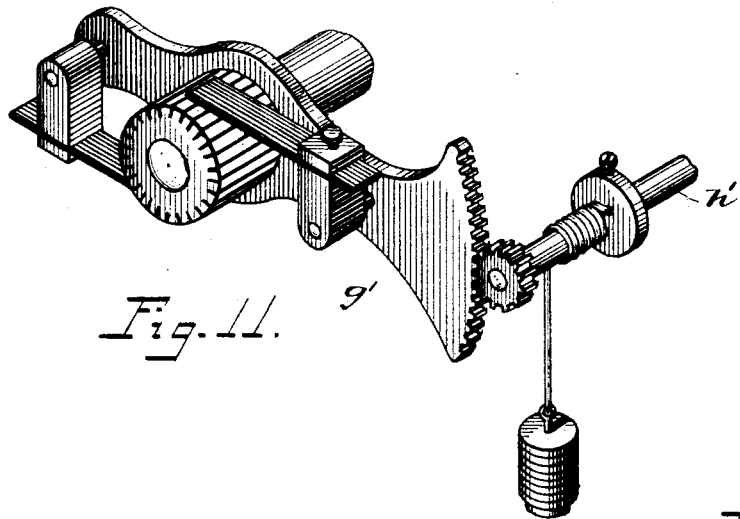
Figure 12:
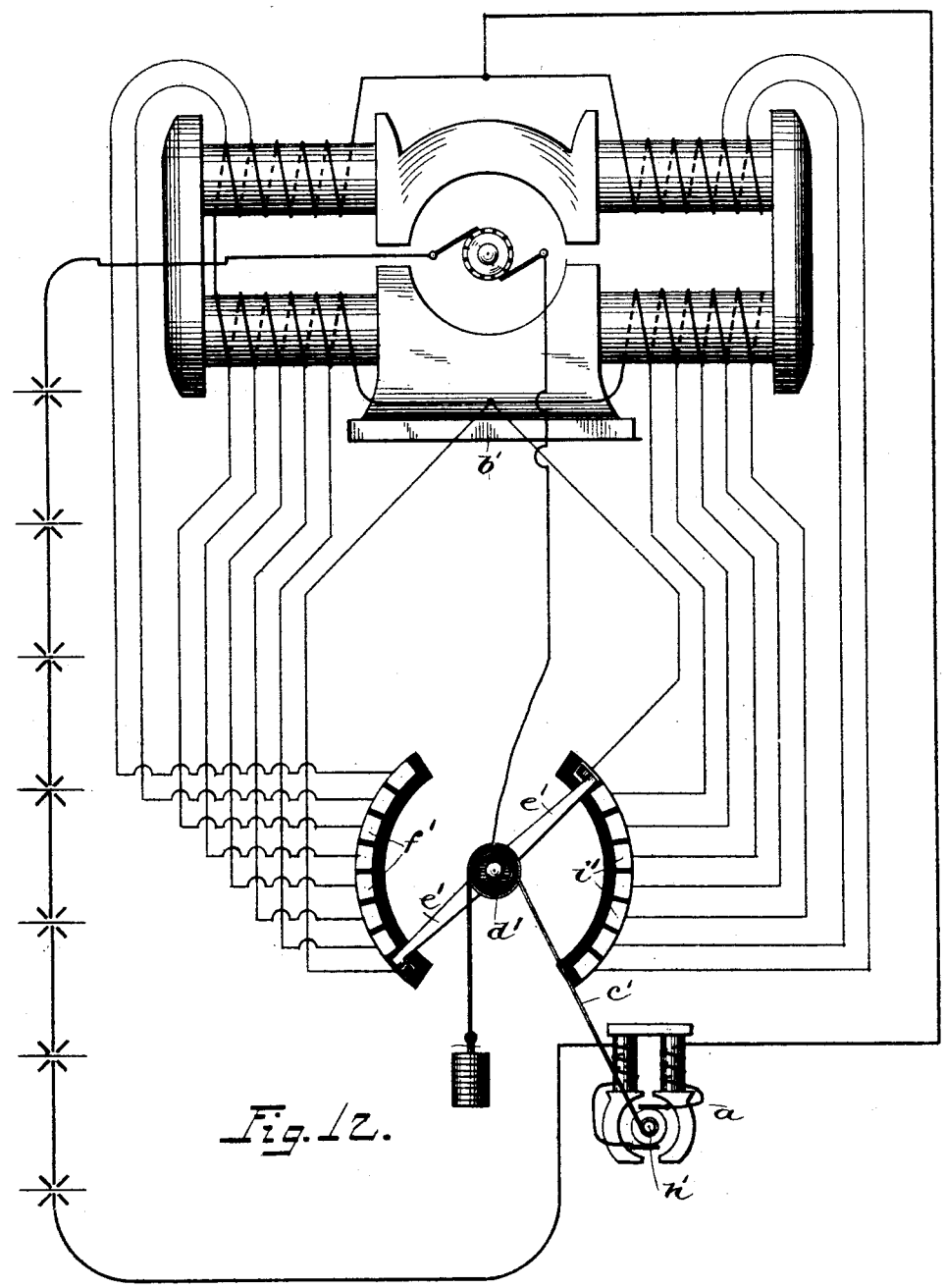
Figure 13:
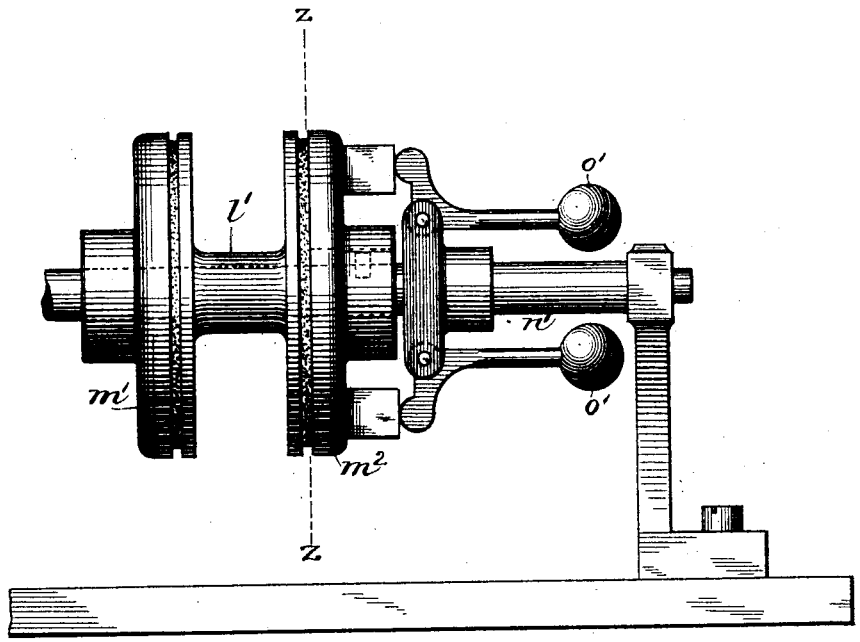
Figure 14:
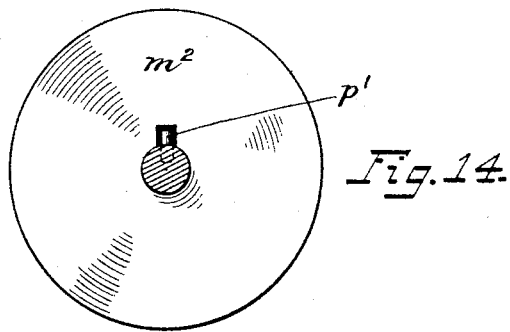

Figure 1 is an end elevation of a dynamo electric machine provided with my regulator. Fig. 2 is a side elevation of a motor provided with a frictional coupling adapted to revolve a shaft, the movement of which shaft changes the position of the brushes, the frictional coupling being shown in section, line $y$—$y$ Fig. 3. Fig. 3 is a detailed view of the frictional coupling as seen from section line $x$—$x$ of Fig. 2. Fig. 4 is a view showing the manner of communicating motion from the motor to the brush carrier to move the brushes. Fig. 5 is a perspective view showing the manner of connecting the cord with the frictionally driven shaft so that it may be wound and unwound thereon to move the brush carrier. Fig. 6 is a diagram illustrative of my regulator as used in an arc light circuit. Fig. 7 is a diagram showing my regulator applied to a circuit containing cells of battery and arranged to cut out and in said cells as the resistance decreases or increases so as to maintain constant current strength. Fig. 8 is a detailed view of the special switch device for cutting out and in the batteries, said switch device being provided with a cord which is wound and unwound by the movement of the frictionally driven shaft. Fig. 9 is a diagram showing my regulator used in connection with a circuit supplied by a generator whose electro motive force may vary, in connection with means for changing the resistance of the circuit to maintain the current strength notwithstanding such variations in electro motive force. Fig. 10 is a diagram showing a modification of the means for varying the resistance of the circuit so as to maintain the current strength notwithstanding variations in electro motive force of the generator. Fig. 11 shows a segment gear and pinion connection between the brush carrier and the frictionally driven shaft. Fig. 12 is a diagram illustrative of my regulator applied to a dynamo machine in which the brushes are normally stationary, its action being to cut out and in the field coils in response to changes in resistance so as to maintain the current strength. Fig. 13 is a modification showing a frictionally driven pulley instead of a frictionally driven shaft, the friction upon the pulley being increased by the increasing centrifugal force of weighted pivoted arms acting after the manner of governor balls. Fig. 14 is a sectional view on line $z$—$z$ showing the spline which prevents the friction plate from turning upon the shaft.

Like parts are indicated by similar letters of reference throughout the different figures.

I will first describe my invention with reference to Figs. 1, 2, 3, 4, 5 and 6, in which I have shown the preferable form of my apparatus as used in connection with a dynamo electric machine when employed in an arc light circuit.

The motor $a$ may be of any well known construction. I have used the form known commercially as the "C. & C." motor of substantially the size illustrated. I have found it desirable to reduce the number of ampère turns of the field magnet to such an extent that the machine may never reach the point of saturation when placed in a circuit carrying the normal current. Upon the shaft $b$ of this machine I have placed a centrifugal frictional device consisting of a disk $c$ carrying the pivoted centrifugal pressers $d$, these pressers being drawn toward the hub of the disk by spring mechanism $e$. The motor being placed in the circuit its rate of speed will change with changes in the current strength; the rate of revolution of the disk changes in the same manner and hence the centrifugal force or outward pressure of the presser devices $d$ increases when the current is increased and diminishes when the current is weakened.

I make use of the motor with its shaft provided with a frictional presser to change the position of the brushes upon the commutator or to cut out and in the field magnet coils or to vary the number of cells in the circuit or to vary the resistance of the circuit so as to maintain constant current strength under the various conditions under which my frictional motor device is adapted to be applied.

In Fig. 1 I have shown the motor in connection with a dynamo electric machine of the Western Electric type; the winding of the armature may be that described in Patent No. 346,965 granted Ernest P. Warner, August 10, 1886.

In Fig. 6 the motor with the frictional device is shown in connection with a dynamo electric machine in an arc circuit and so arranged as to change the position of the brushes upon the commutator to maintain the current strength as the lamps are cut out or into the circuit.

As shown in Fig. 6 the motor $a$ and the dynamo electric machine $f$ are included in the lamp circuit. The brush carrier $g$ is provided upon the shaft of the machine and is adapted to be moved about the same in a well known way to move the brushes forward to decrease the electro motive force and backward to increase the electro motive force. Between the brush carrier $g$ and the pressers $d$ I have provided a mechanical connection which consists in a shaft $h$ mounted loosely in its bearings, one of its bearings being preferably in the hub of the disk $c$. Upon this shaft is rigidly secured a disk $i$ having a rim surrounding the pressers $d$ and affording a frictional surface or bearing against which said pressers are held when the pressers are thrown outwardly by centrifugal force; the friction between said pressers and the rim varying with the variations in the speed of the motor, that is to say with the changes in the current strength. The force with which the shaft $h$ is driven depends upon the current strength, an increase of current strength increasing the force exerted upon the shaft $h$ and a decrease of current strength diminishing the force exerted upon said shaft $h$. The variation in the force exerted upon the shaft $h$ will be greater than the variation in the speed of the motor shaft $b$ because the centrifugal force increases as the square of the speed. A cord $k$ attached at one end of this shaft and wound around the same and connected at the other end with the brush carrier $g$ is arranged to move the brush carrier so as to move the brushes forward when the cord is being wound upon the shaft $h$. A weight $l$ preferably connected with the dash pot as shown in Fig. 4 serves as a counter balance and tends to move the brush carrier in a direction to bring the brushes backward upon the commutator. The weight $l$ and the force which drives the shaft $h$ act in opposition to one another, the weight being so adjusted as to balance the frictional force exerted upon the shaft $h$ when the current is of the desired or predetermined strength.

As shown in Fig. 6 the motor $a$ and the machine $f$ being in the lamp circuit and the frictionally driven shaft $h$ being connected by cord $k$ with the brush carrier $g$ and the brush carrier being normally forced backward by the weight $l$ the current will be maintained at a constant strength, no matter how the number of lamps in the circuit may be varied.

Suppose the normal current to be eighteen ampères and that all the lamps should be abruptly short circuited, the speed of the motor would instantly increase and the shaft $h$ would be driven with increased force, the weight $l$ would be overcome and the brush carrier shifted forward to bring the brushes to a position where the current given out would be eighteen ampères. This movement of the brushes is, so to speak, instantaneous and no injury results to the machine. Suppose now a number of lamps should abruptly be brought into the circuit, thus increasing its resistance. The speed of the motor would at once decrease accordingly; the force exerted on the shaft $h$ would be also decreased and the weight $l$ would be sufficient to move the brush carrier $g$ against the force of the shaft $h$, thus unwinding cord $k$ from the shaft $h$ and bringing the brushes back far enough to increase the electro motive force sufficiently to maintain the current strength in the circuit of increased resistance.

As shown in Figs. 7 and 8 the motor $a$ is shown connected in a lamp circuit which is supplied by cells of battery. The cord $m$ extends from the frictionally driven shaft $h$ on to a drum $n$; a weight $o$ or other power tends to move the drum against the force of shaft $h$. A switch arm $p$ is carried by this drum, this switch arm being placed in position to sweep across the contacts $q$ connected between the different cells of battery. One end of the lamp circuit after passing through the motor is connected with this arm $p$; the number of cells of battery in the circuit will depend upon the position of this arm with respect to contacts $q$. As shown in the diagram one cell of battery $r$ and one lamp $s$ are included in the circuit, the other lamps being short circuited. The weight $o$ is so adjusted with respect to the motor device that the desired strength of current may be maintained. In case other lamp switches are opened the resistance of the circuit will be increased and less force will be exerted upon shaft $h$ so that the weight $o$ will be sufficient to rotate the drum $n$, and with it the arm $p$ to bring other cells of battery into circuit until the desired strength is obtained. In case lamps are removed from the circuit the reverse action takes place, that is to say, the power exerted on shaft $h$ increases and the arm $p$ is moved to cut out enough of the battery to keep the current at the predetermined strength.

In Fig. 9 the motor $a$ is placed in an electric circuit containing electric lamps, said circuit being supplied with current from a battery $t$; this battery $t$ or whatever the generator may be we will suppose varies inherently in electro motive force; in order that the current may be maintained at a constant strength I have provided for automatically increasing and decreasing the resistance of the circuit to compensate for variations in the electro motive force of the generator. The motor $a$ is the same as heretofore described and is connected with a shaft $h$ as illustrated in Figs. 2 and 3. The cord $t'$ is wound on to the end of a wooden or other non-conducting cylinder $t^2$; a bare conducting wire $t^3$ is wound about cylinder $t^2$ and passes from the same as shown over a metallic cylinder $t^4$ which cylinder $t^4$ is provided with a cord and weight tending to turn the same in a direction to wind the conducting wire off from cylinder $t^2$ on to the metallic cylinder $t^4$. The weight suspended from cylinder $t^4$ acts in opposition to the force exerted upon shaft $h$. This wire $t^3$ is included in the circuit and the amount of the resistance thus introduced into the circuit will depend upon the relative proportion of wire wound upon the respective cylinders, the resistance of the wire wound on cylinder $t^4$ being of course shunted out of the circuit in a well known way. In this manner variations in the electro motive force of the generator $t$ are automatically compensated for by varying the resistance of the circuit.

Other forms of resistance varying devices may be operated by the motor. Thus as shown in Fig. 10 the motor $a$ is included in the lamp circuit and is connected with a drum $u$ which carries a switch arm $u'$ adapted to sweep over the contact points of a rheostat to vary the resistance of the circuit to compensate for variations in the electro motive force of the generator included therein.

In Fig. 11 I have shown a pinion upon the frictionally driven shaft $h'$ which meshes with a segment gear provided upon the brush carrier $g'$; this pinion and segment may be used if desired instead of the cord $k$.

As shown in Fig. 12 the motor $a$ is included in the circuit of the dynamo machine $b'$. The cord $c'$ is wound upon the shaft $h'$ of the motor and passes over a drum $d'$, a weight being suspended from a cord passing in the opposite direction around the drum, said weight acting in opposition to the force exerted upon the shaft $h'$, substantially as illustrated in Figs. 7 and 8. This drum $d'$ is provided with a double arm $e'$ which is adapted to be rotated over corresponding contacts $f'$ $i'$ leading to different portions of the windings of the field magnets of the machine. It is evident that a change in the resistance of the circuit as by cutting out or cutting in lamps will be compensated for by a movement of the arm $e'$ to bring more of the coils of the field of force magnets into circuit when the resistance is increased and to cut out portions of said coils when the resistance is diminished so as to maintain the current strength.

In Fig. 13 I have shown a pulley $l'$ between two friction plates $m'$ $m^2$. This pulley is mounted so as to turn upon the shaft and takes the place of the frictionally driven shaft $h$ of Fig. 2. The shaft $n'$ may be considered as an extension of the motor shaft. The centrifugally operated pressers $o'$ $o'$ are carried by the shaft and the amount of pressure exerted by said centrifugal device upon the plate $m^2$ increases as the square of the speed increases. The friction plate $m'$ is fixed rigidly upon the shaft and the plate $m^2$ is prevented from turning thereon by a spline $p'$ which permits said plate $m^2$ to be moved longitudinally on the shaft to press against the pulley $l'$. I have shown washers between the pulley and the friction plates $m'$ $m^2$; these washers are preferably of cloth saturated with oil.

My invention as thus described may be applied in various ways and to different purposes. The character of the friction surfaces may change or be changed without in any manner impairing its utility; the only difference will be that the normal speed of the motor will adjust itself to such change in the condition of the frictional surface. Thus if the surfaces are dry the motor will run at a less speed than it will if the surfaces be oiled, the current remaining the same. Thus in any event the force exerted by the motor upon the brush carrier or whatever the device may be will depend upon the current strength regardless of changes in the lubrication of the friction surfaces.

I have shown an electric motor as the propelling power; it is evident, however, that the centrifugal frictional device might be used between any revolving device and another device which is to be revolved thereby or other mechanism upon which energy is to be exerted. However my frictional device may be used it is evident that the power transmitted will vary as the square of the speed of the propelling device. Such a centrifugal frictional device I believe to be broadly new in mechanics.

Having thus described my invention, I claim as new and desire to secure by Letters Patent—

1. The combination with a source of electricity, of a working circuit connected therewith, a regulator for controlling said working circuit, a frictional device to operate said regulator and an electric motor to actuate the frictional device, substantially as described.

2. The combination with means for varying the strength of the current traversing an electric circuit, of a frictional device adapted to actuate said means, and an electric motor included in said circuit adapted to rotate said frictional device, substantially as described.

3. The combination with a number of elements instrumental in producing electric currents, of means for placing more or less of said elements effectively in position for the production of electric currents, or for removing the same from such effective positions, and an electric motor of the continuously revolving type included in said circuit and adapted to actuate said means, substantially as described.

4. The combination with a number of sources of electricity, of means for placing more or less of said sources effectively in an electric circuit, or removing the same therefrom, a frictional device adapted to actuate said means, and an electric motor included in said circuit adapted to rotate said frictional device, substantially as described.

5. In a current regulator for dynamo electric machines, the combination with the shifting brush carrier, of a frictional device to operate the said carrier, and an electric motor in circuit with the dynamo to rotate said frictional device, substantially as described.

6. A dynamo electric machine provided with a brush carrier adapted to be moved about the shaft of the armature to move the brushes forward and backward to vary the voltage of the machine, in combination with an arc light circuit supplied by said machine, and a centrifugal frictional motor device consisting of an electric motor in the circuit of the dynamo electric machine, and a frictional coupling connected with the brush carrier, a counter balancing device connected with the brush carrier to oppose the force of the frictional motor, whereby the current is maintained at the required strength notwithstanding abrupt variations in the resistance of the circuit.

7. A motor included in an arc light circuit supplied by a dynamo electric machine, in combination with a centrifugal frictional device, through the medium of which said motor is connected with the brush carrier of the dynamo, whereby variations of the speed of the motor caused by variations in the strength of the current flowing in said circuit, are caused to change the position of said brushes of the dynamo machine automatically to vary the voltage to compensate for such variations in current strength, thereby tending to maintain a uniform current strength, substantially as and for the purpose specified.

8. The combination with the shaft of a motor included in the circuit of a dynamo electric machine, of a centrifugal frictional device consisting of centrifugal pressers, said pressers being pressed against the frictional surface of a device adapted to be revolved thereby with a force dependent upon the friction caused by the centrifugal pressers, said device, which is revolved by the friction of the centrifugal pressers, being connected with the brush carrier of the dynamo machine and adapted to move the same to carry the brushes forward to decrease the voltage of the machine when the resistance of the circuit is abruptly decreased, thereby maintaining a uniform current strength, substantially as and for the purpose specified.

9. The combination with the shaft of a motor included in the circuit of a dynamo electric machine, of centrifugal pressers, said pressers being forced against the frictional surface of a device adapted to be revolved thereby with a force dependent upon the friction caused by the centrifugal pressers, the brush carrier to which said device revolved by the centrifugal friction pressers is connected by a cord, said cord being wound upon said device when the same is revolved by the action of the friction pressers, substantially as and for the purpose specified.

10. The combination with a motor included in a circuit containing a generator and arc lamps, of centrifugal pressers rotated by the shaft of said motor, a shaft provided with a frictional surface bearing against which surface the centrifugal pressers are adapted to be forced with a pressure dependent upon the speed of the motor to revolve the said frictionally driven shaft with a force dependent upon the speed of the motor, said frictionally driven motor being connected with the brush carrier of the dynamo electric machine, substantially as and for the purpose specified.

In witness whereof I hereunto subscribe my name this 23d day of March, A. D. 1889.

CHARLES DARWIN HASKINS.

Witnesses:
GEORGE P. BARTON,
CHAS. G. HAWLEY.